No. 774,279. PATENTED NOV. 8, 1904.
G. T. SEABURY.
LIVE STOCK SPRAYING MACHINE.
APPLICATION FILED FEB. 9, 1904.
NO MODEL. 5 SHEETS—SHEET 1.
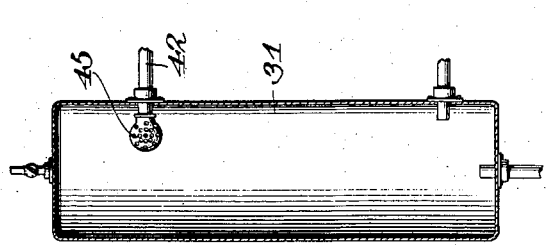
Fig. 5.
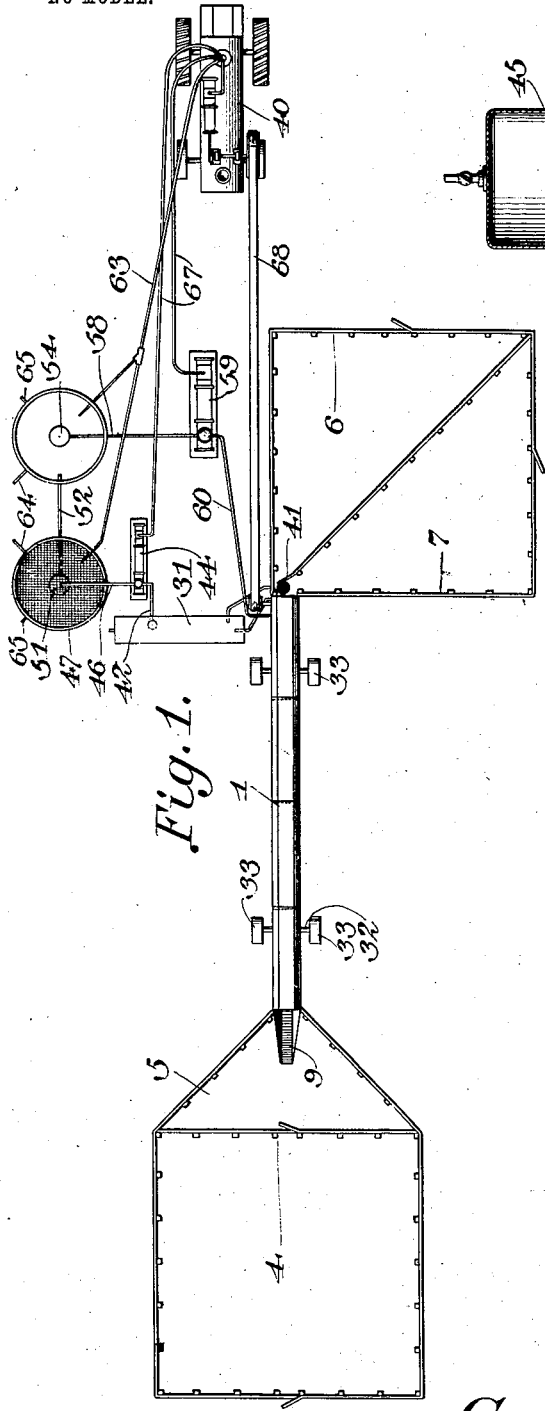
Fig. 1.
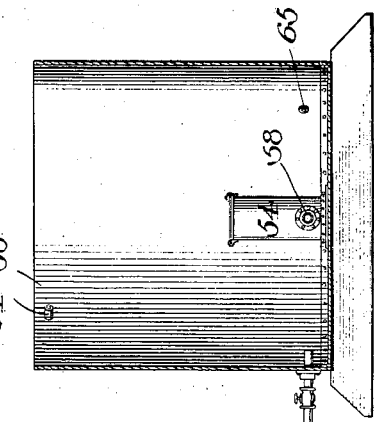
Fig. 4.
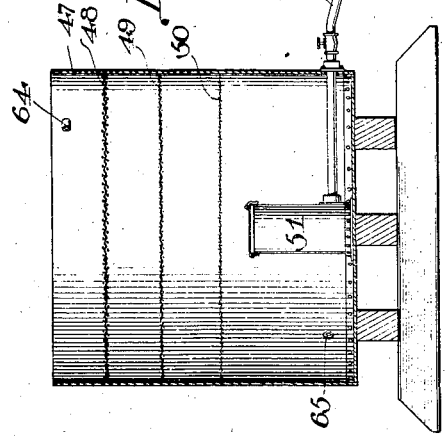
Witnesses
Gorham T. Seabury, Inventor.
by
Attorneys

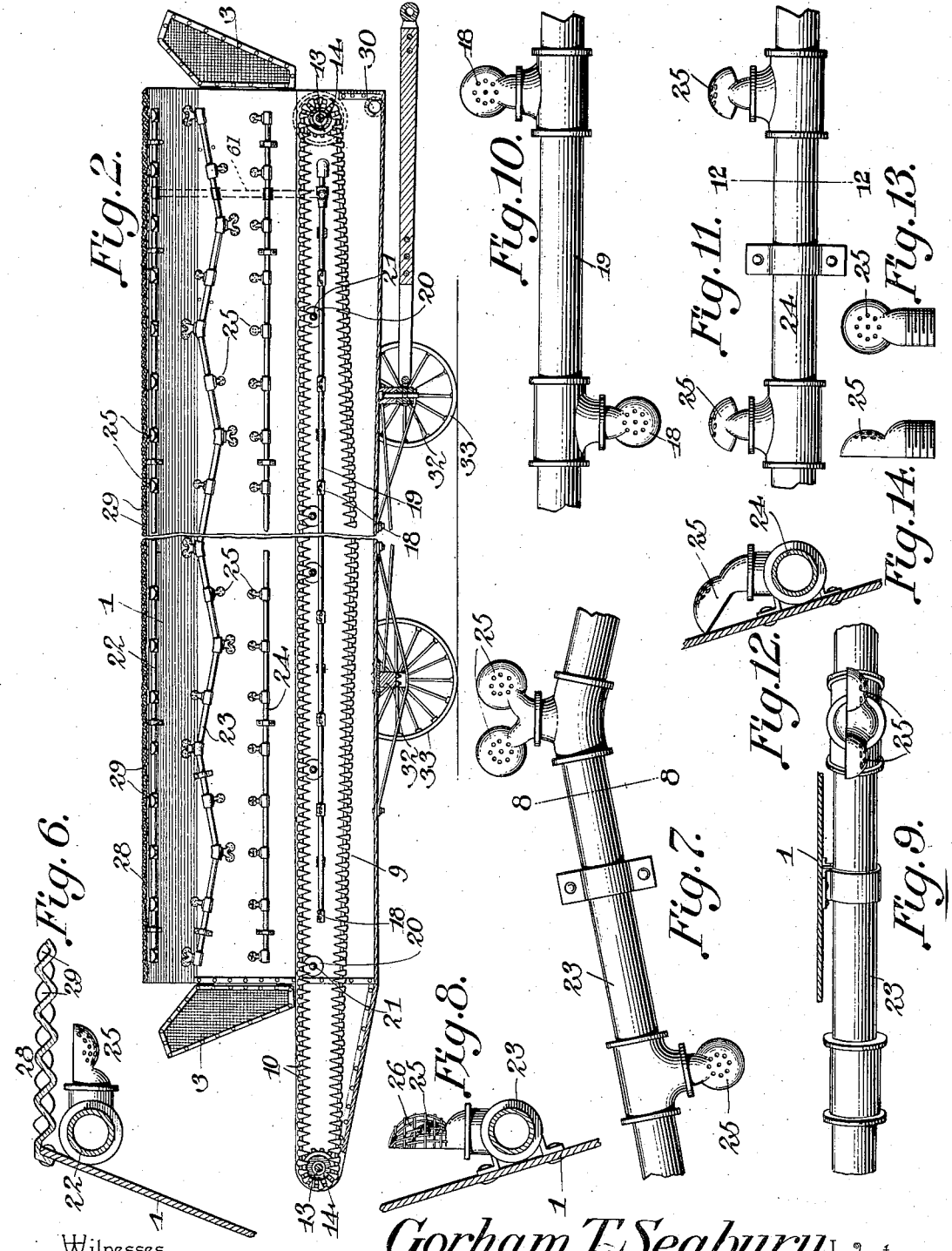

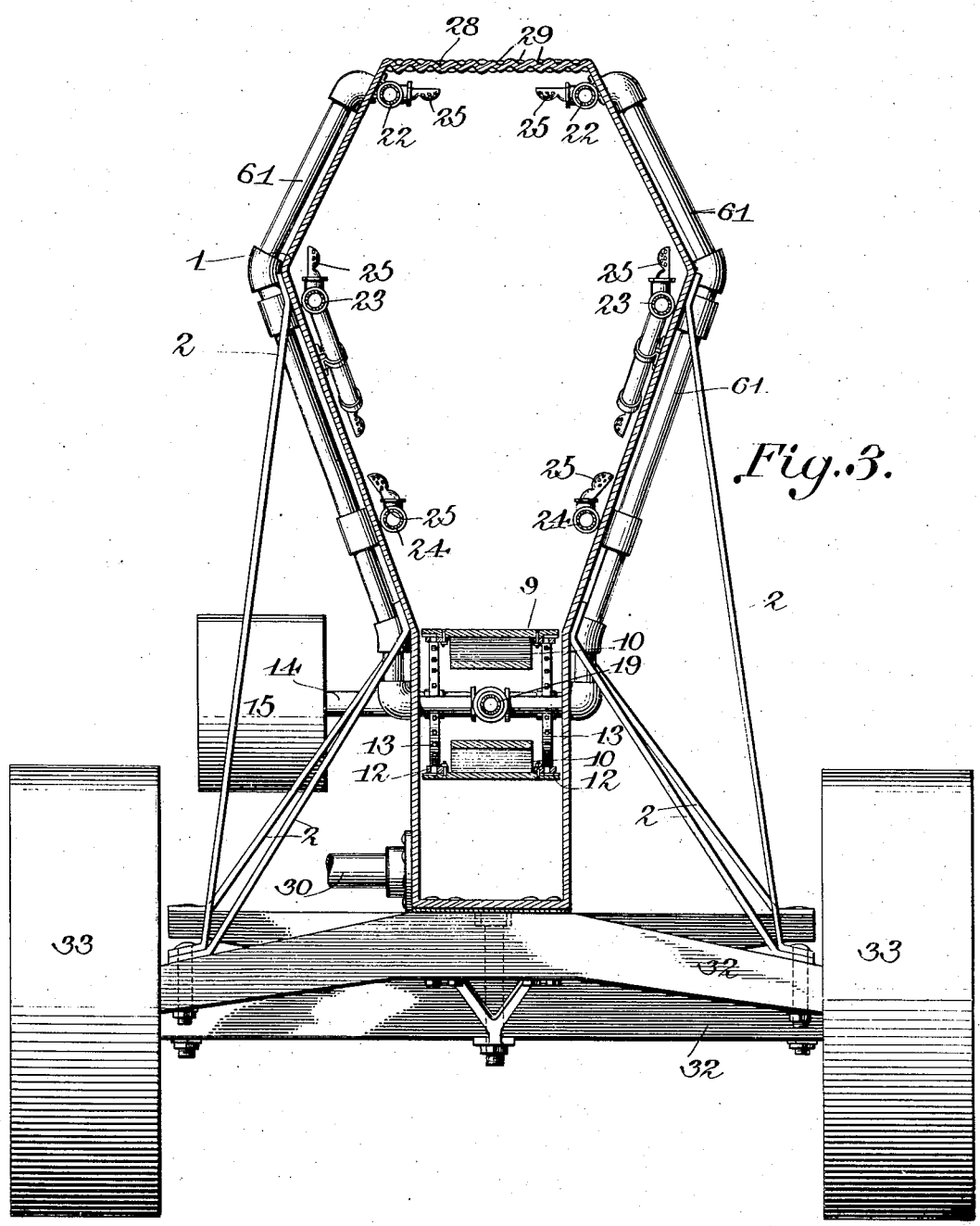

No. 774,279. PATENTED NOV. 8, 1904.
G. T. SEABURY.
LIVE STOCK SPRAYING MACHINE.
APPLICATION FILED FEB. 9, 1904.
NO MODEL. 5 SHEETS—SHEET 4.
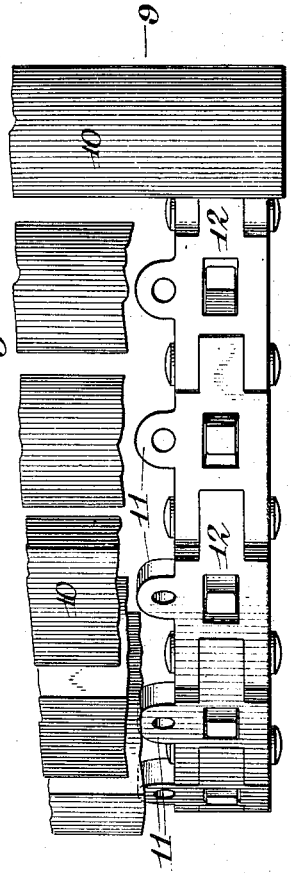
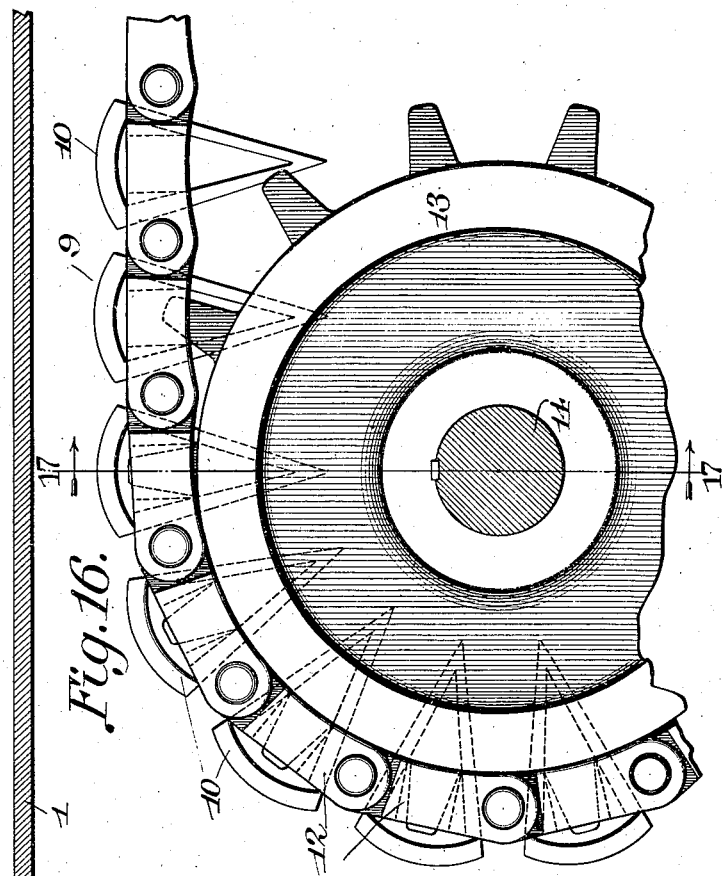
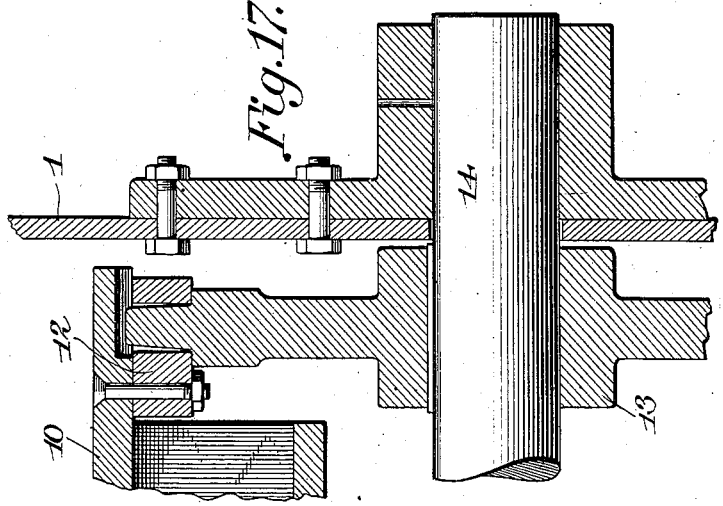
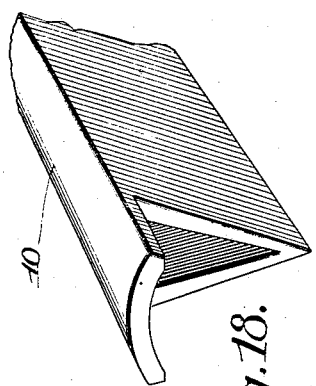
Witnesses
Gorham T. Seabury, Inventor.
by
Attorneys No. 774,279. PATENTED NOV. 8, 1904.
G. T. SEABURY.
LIVE STOCK SPRAYING MACHINE.
APPLICATION FILED FEB. 9, 1904.
NO MODEL. 5 SHEETS—SHEET 5.
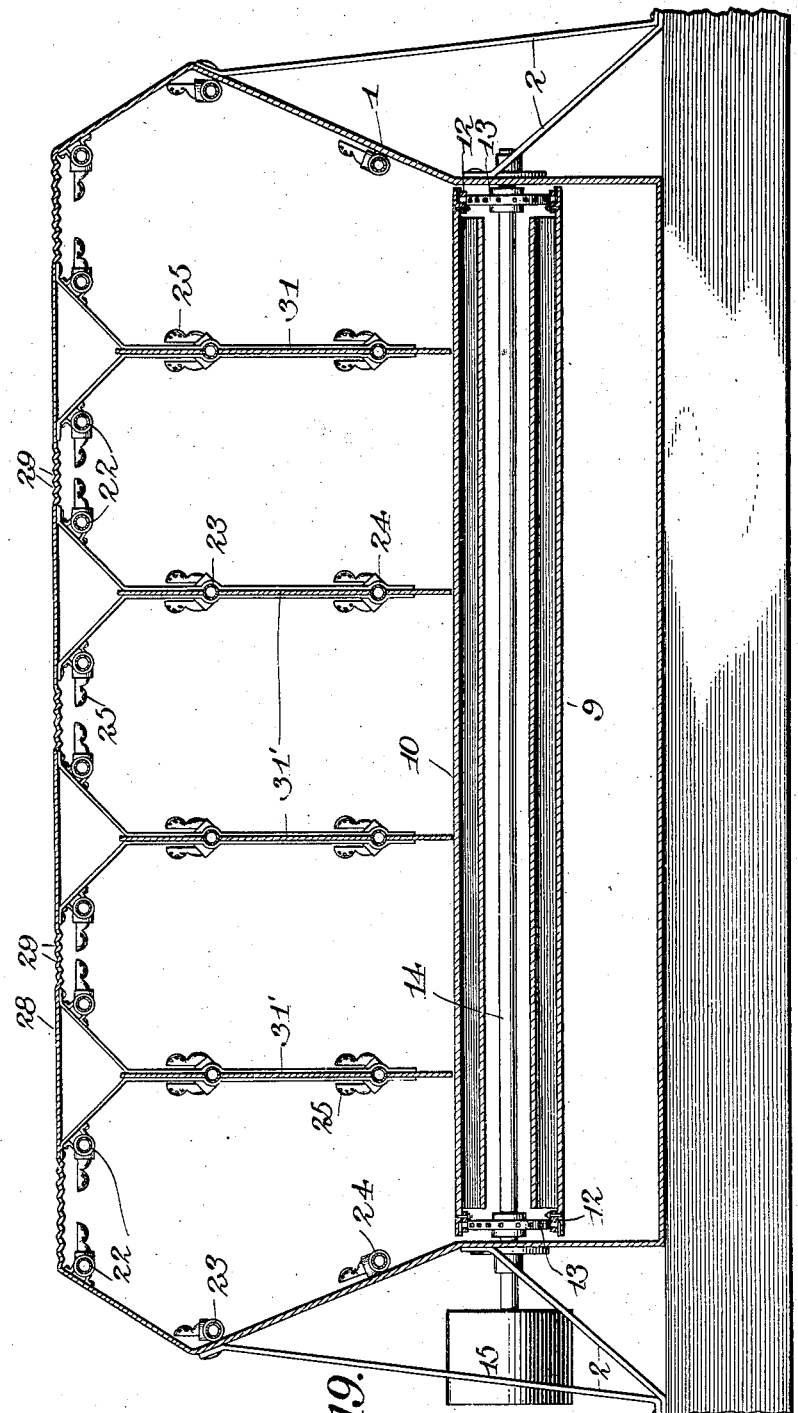
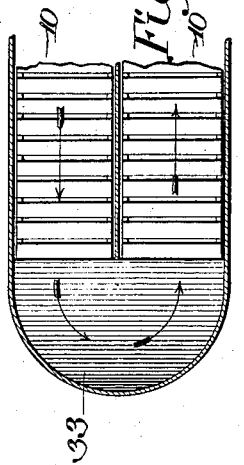
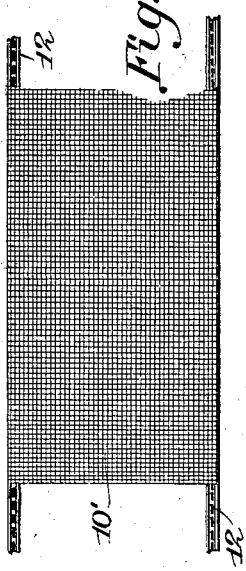
Witnesses
Gorham T. Seabury, Inventor.
by
Attorneys No. 774,279. Patented November 8, 1904.

UNITED STATES PATENT OFFICE.

GORHAM T. SEABURY, OF CHEYENNE, WYOMING.

LIVE-STOCK-SPRAYING MACHINE.

SPECIFICATION forming part of Letters Patent No. 774,279, dated November 8, 1904.

Application filed February 9, 1904. Serial No. 192,797. (No model.)

*To all whom it may concern:*

Be it known that I, GORHAM T. SEABURY, a citizen of the United States, residing at Cheyenne, in the county of Laramie and State of Wyoming, have invented a new and useful Live-Stock-Spraying Machine, of which the following is a specification.

The principal object of the invention is to provide a device for spraying sheep and other animals in the treatment of various diseases or for the removal of ticks or other acarida and mites with which animals are infected.

A further object of the invention is to provide a spraying-machine in which provision is made for spraying each animal with the liquid in the purest form and without contact with another animal or animals, and thus avoid one of the most objectionable features of the ordinary method of sheep-dipping.

A further object of the invention is to so arrange the spraying device as to provide for thorough saturation of the wool or fur of the animal and the destroying of the ova or eggs of the parasite without rendering it necessary to first break down and remove the protecting-scale, which usually is accomplished by a brush or comb prior to the dipping, the jets of liquid being directed against the animals with sufficient pressure to automatically accomplish the desired results.

A still further object of the invention is to provide a mechanism by which the fleece or fur of the animals may be thoroughly saturated without subjecting the animal to rough treatment and without rendering it necessary to rely on workmen, who at times will neglect to properly dip some of the animals, and at the same time, while carrying on the operation in a more gentle manner, obviate the heavy shrinkage and injury which necessarily results when the animals are dipped by hand.

A still further object of the invention is to provide a mechanism in which the degree of solution will be uniform, so that all of the parasites and other ova will be destroyed, and the mechanism is so arranged that the speed of operation and the pressure under which the jets are directed against the animal may be altered in accordance with circumstances.

A still further object of the invention is to provide for the saturation of the fleece or fur without danger of leaving insoluble material in the wool, as in the ordinary hand-dipping, which considerably reduces the commercial value of the wool.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a plan view illustrating the general arrangement of the apparatus forming the subject of the invention. Fig. 2 is a longitudinal sectional elevation of the casing or chamber in which the animals are treated. Fig. 3 is a transverse sectional elevation of the same, drawn to an enlarged scale. Fig. 4 is a sectional elevation of two of the filtering-tanks. Fig. 5 is a plan view of the receiving-tank into which the liquid is directed after contact with the animals. Fig. 6 is a detail sectional view, on an enlarged scale, illustrating the construction of the roof of the casing. Fig. 7 is a detail elevation of a portion of one of the spraying-pipes. Fig. 8 is a detail section on the line 8 8 of Fig. 7. Fig. 9 is a plan view of the pipe and sprayers shown in Fig. 7. Fig. 10 is a plan view of a portion of the pipe and spraying devices for directing jets upward against the bodies of the animals. Fig. 11 is an elevation of the pipe and sprayers arranged in the lower portion of the casing. Fig. 12 is a transverse sectional view of the same on the line 12 12 of Fig. 11. Fig. 13 is a front elevation of a preferred form of rose or sprayer. Fig. 14 is a side elevation of the same. Fig. 15 is a plan view of a portion of the conveyer and one of the sprocket-wheels. Fig. 16 is a side elevation of the same. Fig. 17 is a transverse sectional elevation on the line 17 17 of Fig. 16. Fig. 18 is a detail perspective view of a portion of one of the treads.

Fig. 19 is a transverse sectional elevation of a stationary apparatus also embodying the invention. Fig. 20 is a plan view of a modified construction in which the animals are directed through parallel casings or chambers. Fig. 21 is a view of the modified construction of tread or conveyer.

Similar numerals of reference are employed to indicate corresponding parts throughout the several figures of the drawings.

It is well known that sheep and other animals often become infected with sheep-ticks and other parasites, and to destroy these the usual process consists in first rubbing the animals with a stiff brush or currycomb in order to break the scales which protect the ova and acari, after which the sheep are dipped into vats containing oil or other solution which will destroy both the parasites and the ova. It often happens that the workmen will neglect to entirely immerse each animal the required number of times, and those which are imperfectly dipped are likely to retain parasites, and thus infect others with which they come into contact after they leave the vats. Aside from this the animals are subjected to a certain amount of rough treatment, which results not only in the heavy shrinkage of animals and great bodily suffering, but which results also in loss by abortion.

A still further objection to the hand-dipping process is that the animals are dipped one by one into the same vat, and the liquid after a time will become unfit for use, rendering it necessary to empty and clean the vat and then refill it with fresh material before the dipping operation can be continued, and unless extreme care is taken to remove from the fluid all portions of ingredients that are insoluble some of these will be retained in the wool or hair of the animal, greatly reducing its commercial value.

In carrying out the present invention all of these disadvantages will be obviated, and each animal is treated with a solution that is thoroughly clean and of full strength, the liquid being filtered and strained a number of times before coming into contact with another animal, so that it is entirely free from filth and infection. The continuous filtering and straining will, moreover, remove all of the insoluble matter and prevent loss from this cause. Each animal is individually treated and the degree of saturation is uniform, and the arrangement of the mechanism is such that the operation is continuous, there being no stopping for the emptying and cleaning of tanks for the renewing of the supply of liquid.

The mechanism may be stationary or it may be mounted on suitable running-gear, so as to permit of ready transportation from place to place.

In the preferred form the casing 1 of the machine is made about thirty feet, more or less, in length and of suitable height and width to permit the passage of a single row of animals. In the stationary form the casing may be divided by a plurality of partitions into any desired number of runways or chambers, so that the capacity of the machine may be increased.

The casing 1 is preferably formed of sheet-steel riveted together and braced by stays 2, formed of angle-iron and rods, and the contour in cross-section of the casing is such as to conform in general to the animal, so that there will be no danger of the animal turning or becoming wedged. At each end of the casing are doors 3, which may be closed, if necessary, while the animals are in the casing; but usually these will be opened and the animals carried or driven through in a continuous line.

At one end of the machine is a receiving-pen 4, which communicates with a close pen 5, the sides of which taper toward the side walls of the runway, so that the animals may be readily driven in the end of the latter. At the opposite end of the runway are two pens 6 and 7, the animals entering the pen 6 and being held there until the surplus liquid has drained onto the floor of the pen, and this flooring is so arranged that the liquid will be collected and saved for further use. During the draining of animals in pen 6 the pen 7 may be filled, the pens being alternately filled and emptied.

In the lower and narrowest portion of the runway is an endless conveyer 9, which may be formed of any suitable material, the preferred construction comprising tubes 10, that are of V shape in cross-section and have upper rounded walls, which are extended at each end for some distance beyond the main portion of the pipe and are bolted or otherwise secured to lugs 11, projecting from the links 12 of a sprocket-chain. The outer ends of the curved top portions of the treads are recessed in order to pass freely over the teeth of the sprocket-wheels 13. Two sprocket-wheels are disposed at each end of the machine and mounted on shafts 14, one of the shafts being provided with a belt or other wheel 15, to which motion may be imparted from any suitable source of power. The treads are slightly spaced from each other in order to permit the free passage of liquid, and the angularly-related walls of the treads are of such nature as to permit the free passage of upwardly-directed jets of liquid from suitable nozzles or sprays 18, that are connected to a liquid-supply pipe 19 and force the liquid up into contact with the feet and lower portion of the bodies of the animals. The endless conveyer is preferably supported at intervals by rollers 20, mounted on suitable transverse shafts 21, that have bearings on the opposite sides of the casing. The roses or sprays 18 are preferably arranged alternately on opposite sides of the pipe 19, so that during the travel of the animal from end to end of the machine all of the lower portion of its body will be thoroughly saturated, and such roses or sprays may be of any desired character and the liquid-supply under any pressure in accordance with the size and character of the animals, the weight of the wool or hair, and the disease or infection for which they are to be treated.

The conveyer extends, preferably, for some distance from the entrance end of the machine, so that no difficulty will be experienced in forcing the animals to enter the casing, and said conveyer may be formed of other material than the pipes—as, for instance, wire gauze or netting, such as indicated at 10', may be used, the netting being secured to eyes or links of the sprocket-chains or other conveyer elements at intervals—or the tread may be formed partly of pipes and partly of the wire-netting, or any other form of open or reticulated tread may be used that will permit the free passage of liquid. On each side of the interior of the casing are arranged sets of pipes 22, 23, and 24, although the number of sets of pipe may be increased or diminished to any desired extent, and they may be provided with branches disposed in clusters wherever necessary. Each of the pipes is provided with roses or sprays 25, of which there may be any desired number, and the construction of these may be altered in accordance with circumstances, or they may be of different character in the same machine, so that some may direct minute jets under great pressure where the wool or hair is thickest, while others may act more gently, or the jets may be arranged at greater pressure near the discharge end of the machine, so that the animal may become gradually accustomed to the operation during travel through the machine. The intermediate pipe 23 on each side is preferably arranged in a waved or zigzag line, so as to direct jets at different horizontal planes, and all of the roses or sprays are preferably provided with hoods 26, formed of wire-netting or the like in order to prevent clogging of the sprays by wool or hair from the animals. Each of the sprays 25 is so coupled and connected to its supply-pipe as to permit the adjustment to any desired position, and some of these will be arranged to direct jets in a direction nearly lengthwise of the casing, so that the animal's breast and rump may be thoroughly saturated. The roof of the casing is made of sheet or sheets of metal 28, having numerous angular pockets 29, the walls of which form deflecting-surfaces, so that any of the jets of liquid which may strike against the roof will be directed downward against the back of the animal.

In the operation of the mechanism as thus far described the animals are assembled in the receiving-pen and gradually driven to the pen 5, from which they are directed into the endless conveyer and travel through to the discharge end of the machine. During travel through the casing the animals will be thoroughly saturated with the ooze or oil or other solution, and the jets will be directed with a degree of force sufficient to open up all of the scales which protect the ova of the parasites, so that the latter will be washed away or thoroughly destroyed by the time the animal reaches the drainage-pen. The liquid directed against each animal is pure and of full strength and if it has been previously used will first be strained and filtered a sufficient number of times to remove all filth and foreign material, and, if necessary, additional ingredients may be added to keep it up to a standard strength. The liquid dripping from the animals falls to the bottom of the casing, and this bottom inclines toward the discharge end, at which point is connected a drainage-pipe 30, leading to a tank 31.

When the apparatus is of a portable nature, it is mounted on suitable axles 32, having supporting-wheels 33 with wide treads, so that the machine may be safely transported over rough ground to the point where the sheep are to be operated upon, and, if necessary, the arrangement of the pens and runways may be such that a shorter casing could be used, and the animals may be made to travel twice or as many more times as may be necessary through the casing. In stationary machines a number of runways would be formed by dividing the casing by means of longitudinal partitions 31'. As a further modification of this portion of the invention reference is had to Fig. 20, wherein a pair of runways is shown, each having a conveyer 10, the conveyers traveling, respectively, in opposite directions and terminating at a semicircular platform 33, around which the sheep may be driven or forced to travel from one runway to the other. This permits of the shortening of the length of the machine by adding to its width.

In connection with the apparatus there is employed a suitable steam-boiler, which in the case of a portable machine takes the form of a portable traction or stationary engine 40, which in addition to supplying the power for operating the machine may also be used as traction means for hauling the machine from place to place.

The tank 31, previously referred to, receives the material drained from the casing and is further connected to a cesspool 41 at the end of the dripping-pen, so that any of the liquid which may drain from the sheep while in the pen and all of the surplus liquid from the casing will be returned to this tank. To the tank 31 is connected a suction-pipe 42 of a low-pressure pump 44, and at the inlet end of said pipe is a filter or strainer 45, so that the major portion of the filth and foreign matter will be retained in the tank 31.

The pump 44 discharges through a pipe 46 to the top of a filtering and straining tank 47, in which are arranged straining and filtering devices of any desired number and character. In the present instance the tank is shown as provided with three superimposed screens 48, 49, and 50, the uppermost screen being of comparatively coarse mesh, the next of finer mesh, and the third of very fine mesh, so that only the pure liquid will be allowed to enter the bottom of the tank.

At the central portion of the tank 47 is a cylindrical filter 51, which may be formed of any suitable material, and from the central portion of the filter extends a pipe 52, leading to a second tank 53. In the tank 53 is a filter 54, also formed of suitable filtering and straining material, and from the center of the filter leads a suction-pipe 58 of a high-pressure pump 59, the pump forcing the purified liquid through a pipe 60 to a suitable manifold 61, connected to the several straining-pipes.

Steam is supplied to the tanks through a pipe 63 in order that the liquid may be maintained at any desired temperature, and these tanks are further provided with liquid-supply pipes 64 and drains 65 for convenience in washing when necessary. The pumps are supplied with steam through pipes 67, and the inner shaft of the conveyer mechanism is operated by means of a suitable duct 68 from the engine.

All the steam and all the ooze or oil pipes are made of flexible hose wound or wrapped with wire for the purpose of retaining the heat in the fluid for a greater time than would be possible if metal pipes were used, and another advantage in having the piping flexible is that it will be easier to set the machine in position in readiness for operation.

The size of the plant and the arrangement of its connections may be altered in various ways and the apparatus used for spraying animals of all classes for the treatment of diseases or infections, and in some cases in place of using insecticide the pipes may be used to direct medicated vapors against the animals to be treated without departing from the invention.

While the use of steam has been described as the medium for injecting the oil or other spraying material, it is to be understood that any fluid under pressure may be employed and that any suitable means may be used for pumping the oil and that the oil or other spraying fluid may be heated or not, as circumstances require.

Having thus described the invention, what is claimed is—

1. An animal-spraying device, including an elongated chamber for the passage of the animals and open at both ends to permit their entrance and exit, and spraying devices arranged therein.

2. In an apparatus for the treatment of animals, a chamber or casing, devices for directing jets of fluid against the animals, means for collecting and for filtering the surplus fluid, and means for forcing such fluid to the jet-directing devices.

3. In an apparatus for the treatment of animals, a chamber or casing, spraying devices arranged therein, and means for collecting the surplus fluid and returning the same to the spraying devices.

4. In an apparatus for the treatment of animals, a chamber or casing, fluid-spraying devices arranged therein, a drainage-tank for the reception of the surplus fluid, a fluid-filtering means, and means for forcing the filtered fluid to the spraying devices.

5. In an apparatus for the treatment of animals, an elongated chamber for the passage of the animals, and spraying devices for directing fluid against the animals during their passage through the chamber.

6. In an apparatus for the treatment of animals, an elongated chamber for the passage of the animals, and a plurality of spraying devices arranged to direct jets of fluid against all portions of the bodies of the animals during such passage.

7. In an apparatus for the treatment of animals, an elongated chamber having an inlet and an outlet, and spraying devices arranged at different levels in such chamber.

8. In an apparatus for the treatment of animals, an elongated chamber or casing for the passage of the animals, said chamber or casing having an open or reticulated flooring, and means for directing jets of fluid upward through said flooring.

9. In an apparatus for the treatment of animals, a casing having an open or reticulated flooring, and means for directing jets of fluid under pressure upward through the openings in the flooring.

10. In an apparatus for the treatment of animals, an elongated chamber for the passage of the animals, spraying devices disposed in said chamber, one of the walls of said chamber being provided with fluid-deflecting pockets.

11. In an apparatus for the treatment of animals, an elongated chamber for the passage of the animals, one of the walls of said chamber forming fluid-deflecting surfaces, and spraying devices disposed within said chamber.

12. In an apparatus for the treatment of animals, a chamber having a roof portion provided with a plurality of deflecting-pockets, and spraying devices arranged in said chamber.

13. In an apparatus for the treatment of animals, a chamber for the passage of the animals, a plurality of tubes or pipes arranged at different levels throughout the length of the chamber, and roses or spraying devices carried by said pipes.

14. In an apparatus for the treatment of animals, an elongated chamber, a spraying-pipe arranged within the chamber and having pipes running in a zigzag line, and spraying devices carried by said pipe.

15. In an apparatus for the treatment of animals, a spraying-chamber having an inclined bottom portion, and provided with a pipe for draining the surplus fluid from the chamber.

16. In an apparatus for the treatment of animals, a spraying-chamber, and a drainage-pen in communication with said chamber, said pen having an inclined flooring for draining off the surplus liquid.

17. In an apparatus for the treatment of animals, a spraying-chamber, and a drainage-pen provided with an inclined flooring, there being a cesspool or liquid-collecting device at the lowermost portion of the flooring.

18. In an apparatus for the treatment of animals, a spraying-chamber, a filtering-tank, a drainage-tank leading from the chamber to the filtering-tank, and a pipe leading the filtered material from the filtering-tank to the spraying-chamber.

19. In an apparatus for the treatment of animals, a spraying-chamber, a drainage-tank, a filtering-tank communicating therewith, screens of successively finer mesh arranged in the filtering-tank, a force-pump for directing the filtered liquid from the tank to the spraying-chamber, and means for heating the liquid in the tank.

20. In an apparatus for the treatment of animals, a spraying-chamber, a drainage-pen, a pair of successive filtering-tanks through which the liquid is directed from the drainage-tank, a force-pump for directing the liquid from the filtering-tank to the spraying-chamber, and means for heating the tank.

21. In an apparatus for the treatment of animals, a traveling conveyer for the animals, and a spraying device for directing jets of fluid against the animals on the conveyer.

22. In an apparatus for the treatment of animals, an endless conveyer, and stationary spraying devices adjacent to said conveyer.

23. In an apparatus for the treatment of animals, an endless conveyer, and a plurality of spraying devices arranged in different horizontal planes with respect to the conveyer.

24. In an apparatus for the treatment of animals, a casing having spraying devices, and an endless conveyer arranged in said chamber.

25. In an apparatus for the treatment of animals, a chamber, spraying devices disposed therein, and an endless conveyer arranged within and above the bottom of said chamber.

26. In an apparatus for the treatment of animals, a chamber, spraying devices therein, and an endless conveyer having openings for the passage of the fluid, one of the spraying devices being disposed below the upper run of the conveyer for directing jets upward through said openings.

27. In an apparatus for the treatment of animals, a chamber, spraying devices disposed within said chamber, and a conveyer formed of a plurality of spaced bars, one of the spraying devices being disposed below the upper run of the conveyer for directing jets of fluid upward through the bars.

28. In an apparatus for the treatment of animals, a chamber, spraying devices disposed therein, an endless conveyer fromed of spaced bars V-shaped in cross-section, one of the spraying devices being disposed below the upper run of the conveyer to direct jets of fluid upward between the bars.

29. In an apparatus for the treatment of animals, a chamber, spraying devices arranged therein, an endless conveyer formed of a plurality of spaced V-shaped bars or tubes, an auxiliary spray-pipe arranged under the upper run of the conveyer, and roses projecting alternately from opposite sides of said pipe.

30. In apparatus for the treatment of animals, an elongated chamber for the passage of the animals, said chamber being of a shape in cross-section corresponding approximately to the height, width and general contour of a single animal, thereby to prevent turning of the animal during its passage through the chamber.

In testimony that I claim the foregoing as my own I have hereto affixed my signature in the presence of two witnesses.

GORHAM T. SEABURY.

Witnesses:
 FRED W. ROEDEL,
 THOMAS F. DURBIN.